(12) United States Patent
Miwa

(10) Patent No.: US 8,786,632 B2
(45) Date of Patent: Jul. 22, 2014

(54) MAP IMAGE DISPLAY SYSTEM, MAP IMAGE DISPLAY DEVICE, MAP IMAGE DISPLAY METHOD, AND COMPUTER PROGRAM

(75) Inventor: Diasuke Miwa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 209 days.

(21) Appl. No.: 13/428,791

(22) Filed: Mar. 23, 2012

(65) Prior Publication Data

US 2012/0262482 A1 Oct. 18, 2012

(30) Foreign Application Priority Data

Apr. 14, 2011 (JP) .................. 2011-090037

(51) Int. Cl.
  G09G 5/00  (2006.01)
  G01C 21/36 (2006.01)
  G01C 21/32 (2006.01)
(52) U.S. Cl.
  CPC .............. G01C 21/367 (2013.01); G01C 21/32 (2013.01)
  USPC ........................................................ 345/629
(58) Field of Classification Search
  USPC ........................................................ 345/629
  See application file for complete search history.

(56) References Cited

U.S. PATENT DOCUMENTS

| | | | | |
|---|---|---|---|---|
| 6,011,494 A | * | 1/2000 | Watanabe et al. | 340/995.14 |
| 6,202,026 B1 | * | 3/2001 | Nimura et al. | 701/455 |
| 6,650,326 B1 | * | 11/2003 | Huber et al. | 345/428 |
| 8,427,508 B2 | * | 4/2013 | Mattila et al. | 345/634 |
| 2008/0133579 A1 | * | 6/2008 | Lim | 707/102 |
| 2008/0238941 A1 | * | 10/2008 | Kinnan et al. | 345/630 |
| 2009/0112452 A1 | * | 4/2009 | Buck et al. | 701/117 |
| 2009/0177393 A1 | * | 7/2009 | Tertoolen et al. | 701/212 |

FOREIGN PATENT DOCUMENTS

JP  A 2002-072869  3/2002

* cited by examiner

Primary Examiner — M Good Johnson
(74) Attorney, Agent, or Firm — Oliff PLC

(57) ABSTRACT

Map image display systems, devices, methods, and programs divide a display target area into a plurality of division areas with parts of neighboring ones of the division areas overlapping each other, and generate a map image for each of the division areas, each map image being based on a different layer of stored map data. In an area where two or more of the generated map images overlap, a transmittance of a first one of the overlapped map images is gradually changed so that a transmittance of an outer portion becomes higher than a transmittance of an inner portion. The systems, devices, methods, and programs display a second one of the overlapped map images on the display device, and then display the first map image on the display device so that the first map image is overlapped on the displayed second map image.

16 Claims, 8 Drawing Sheets

VIRTUAL POINT-OF-VIEW

NEIGHBORING AREA

DISTANT AREA

MAP IMAGE DISPLAY SYSTEM, MAP IMAGE DISPLAY DEVICE, MAP IMAGE DISPLAY METHOD, AND COMPUTER PROGRAM

INCORPORATION BY REFERENCE

The disclosure of Japanese Patent Application No. 2011-090037, filed on Apr. 14, 2011, including the specification, drawings, and abstract is incorporated herein by reference in its entirety.

BACKGROUND

1. Related Technical Fields

Related technical fields include map image display systems, map image display devices, map image display methods, and computer programs for displaying a map image.

2. Related Art

Recently, a navigation device is mounted in many cases in a vehicle to give driving guidance of the vehicle to allow the driver to reach the desired destination easily. A navigation device refers to a device that detects the vehicle's current position using a GPS receiver, acquires map data on the current position from a recording medium, such as a DVD-ROM or an HDD, or via the network, and displays the map image of the area surrounding the current position on a liquid crystal monitor. Such a navigation device draws the background (sea, river, flatland, forest, mountain, etc.) and the road shape as the map image of the area surrounding the current position. In addition, the map image includes traffic announcements, the navigation route, the POI marks indicating facilities, and so on. Recently, a mobile phone, a Personal Digital Assistant (PDA), and a personal computer have the function similar to that of the navigation device described above.

In addition, some of the recent navigation devices, such as that disclosed in Japanese Patent Application Publication No. 2002-72869 (JP 2002-72869 A) (page 5 to 7 and FIG. 4), displays a map image on a display unit three-dimensionally to increase the user's visibility of the map image.

SUMMARY

When a map image is displayed three-dimensionally, the display target area of a display object on the display becomes larger than that of a map image displayed two-dimensionally at the same scale. This results in an increase in the amount of map data that must be read, causing the problem that the capacity of memory for complementing the map data, which has been read, becomes insufficient. Another problem is a higher CPU processing load and a longer CPU processing time required for drawing a map image based on the map data that has been read. To solve this problem, JP 2002-72869 A describes the configuration in which the facilities and the roads are not displayed if they are in the area at a distance farther than a predetermined distance from the point of view.

However, the technology described in JP 2002-72869 A has the possibility that, because a displayed road or facility differs between the area at a distance farther than a predetermined distance and the area within the predetermined distance, the displayed map image near the boundary at a predetermined distance is not smooth, for example, the road or the facility looks discontinuous.

Exemplary implementations of the broad inventive principles described herein provide a map image display system, a map image display device, a map image display method, and a computer program for reducing the data amount of map data that is read, for reducing the CPU processing load and the CPU processing time required for drawing a map image based on map data that has been read and, in addition, for providing the user an impression of a smooth, continuous map image.

Exemplary implementations provide a map image display system including: a map data acquisition unit that acquires map data that is divided into a plurality of areas and hierarchically structured into a plurality of layers based on an amount of road network information; and an image display unit that displays a map image of a display target area on a display device based on the map data acquired by the map data acquisition unit. In the map image display system, the image display unit includes: an area division unit that divides the display target area into a plurality of division areas wherein parts of neighboring division areas overlap each other; an image generation unit that generates a map image based on a different layer for each of the division areas generated by the division performed by the area division unit; a transmittance change unit that, in an area where the plurality of map images generated by the image generation unit overlap, gradually changes the transmittance of one of the overlapped map images so that the transmittance of the outside of the division area becomes higher than the transmittance of the inside of the division area; and a map image drawing unit that draws the other of the overlapped map images on the display device and, after that, draws the one of the map images, whose transmittance has been changed by the transmittance change unit, on the display device with the one of the map images overlapped on the other.

Note that the "system" may be configured by one device or may be implemented by information transmission and reception by a plurality of devices.

According to exemplary implementations, the image display unit may set an area of a map in the display target area, the area visually recognized when viewing the map downward obliquely from a virtual point-of-view above the map, the area division unit may divide the display target area into the plurality of division areas according to a distance from the virtual point-of-view, and the image generation unit may generate the map image based on a layer, the layer having a larger amount of road network information on a division area nearer the virtual point-of-view.

According to exemplary implementations, the transmittance change unit may gradually change the transmittance of the map image generated based on a layer that is the layer of one of the overlapped map images and has a larger amount of road network information.

According to exemplary implementations, the map image generated by the image generation unit may include an image indicating a background and a road shape.

Exemplary implementations may further include a route image drawing unit that draws a route image on the map image, the route image being an image indicating the shape of a navigation route to a destination, the map image generated by the image generation unit, the route image superimposed on the map image. In the map image display system, the transmittance change unit may change the transmittance of the route image drawn by the route image drawing unit as well as the transmittance of the map image.

Exemplary implementations may further include a congestion image drawing unit that draws a congestion image on the map image, the congestion image being an image indicating a congestion level of a road, the map image generated by the image generation unit, the congestion image superimposed on the map image. In the map image display system, the transmittance change unit may change the transmittance of the congestion image drawn by the congestion image drawing unit as well as the transmittance of the map image.

Exemplary implementations provide a map image display device including: a map data acquisition unit that acquires map data that is divided into a plurality of areas and hierarchically structured into a plurality of layers based on an amount of road network information; and an image display unit that displays a map image of a display target area on a display device based on the map data acquired by the map data acquisition unit. In the map image display device, the image display unit includes: an area division unit that divides the display target area into a plurality of division areas wherein parts of neighboring division areas overlap each other; an image generation unit that generates a map image based on a different layer for each of the division areas generated by the division performed by the area division unit; a transmittance change unit that, in an area where the plurality of map images generated by the image generation unit overlap, gradually changes the transmittance of one of the overlapped map images so that the transmittance of the outside of the division area becomes higher than the transmittance of the inside of the division area; and a map image drawing unit that draws the other of the overlapped map images on the display device and, after that, draws the one of the map images, whose transmittance has been changed by the transmittance change unit, on the display device with the one of the map images overlapped on the other.

Exemplary implementations provide a map image display method including: a map data acquisition step of acquiring map data that is divided into a plurality of areas and hierarchically structured into a plurality of layers based on an amount of road network information; and an image display step of displaying a map image of a display target area on a display device based on the map data acquired by the map data acquisition step. In the map image display method, the image display step includes an area division step of dividing the display target area into a plurality of division areas wherein parts of neighboring division areas overlap each other; an image generation step of generating a map image based on a different layer for each of the division areas generated by the division performed by the area division step; in an area where the plurality of map images generated by the image generation step overlap, a transmittance change step of gradually changing the transmittance of one of the overlapped map images so that the transmittance of the outside of the division area becomes higher than the transmittance of the inside of the division area; and a map image drawing step of drawing the other of the overlapped map images on the display device and, after that, drawing the one of the map images, whose transmittance has been changed by the transmittance change unit, on the display device with the one of the map images overlapped on the other.

Exemplary implementations provide a computer program that causes a computer to execute a map data acquisition function that acquires map data that is divided into a plurality of areas and hierarchically structured into a plurality of layers based on an amount of road network information; and an image display function that displays a map image of a display target area on a display device based on the map data acquired by the map data acquisition function. In the computer program, the image display function includes an area division function that divides the display target area into a plurality of division areas wherein parts of neighboring division areas overlap each other; an image generation function that generates a map image based on a different layer for each of the division areas generated by the division performed by the area division function; a transmittance change function that, in an area where the plurality of map images generated by the image generation function overlap, gradually changes the transmittance of one of the overlapped map images so that the transmittance of the outside of the division area becomes higher than the transmittance of the inside of the division area; and a map image drawing function that draws the other of the overlapped map images on the display device and, after that, draws the one of the map images, whose transmittance has been changed by the transmittance change function, on the display device with the one of the map images overlapped on the other.

According to exemplary implementations, a plurality of map images can be combined, each based on a layer having a different amount of road network information, to display a map image. This reduces the data amount of map data to be read and, at the same time, reduces the CPU processing load and processing time required for drawing a map image based on map data that has been read. In addition, in an area where the plurality of map images overlap, the map image display system changes the transmittance of one of the map images to prevent the background and the roads, included in the map image, from being displayed discontinuously at the boundary between the map images, giving the user an impression of a smooth, continuous map image.

According to exemplary implementations, the map image of a neighboring area is displayed, where a large amount of information is required, based on a layer that has a large amount of road network information and displays the map image of a distant area, where a large amount of information is not required, based on a layer that has a small amount of road network information, especially when the map image is displayed in bird's eye view. This reduces the data amount of map data to be read and, at the same time, reduces the CPU processing load and processing time required for drawing a map image based on map data that has been read. In addition, the map image display system displays the map image in a form the user feels easy to view.

According to exemplary implementations, the transmittance of a map image, generated based on a layer having a large amount of road network information, is changed in an area where the plurality of map images overlap. This prevents the background and roads, included in the map image, from being displayed discontinuously at the boundary between the map images, giving the user an impression of a smooth, continuous map image.

According to exemplary implementations, the transmittance of a map image, which includes the background and roads, is changed in an area where the plurality of map images overlap. This prevents the background and roads, included in the map image, from being displayed discontinuously at the boundary between the map images, giving the user an impression of a smooth, continuous map image.

According to exemplary implementations, both the transmittance of the route image drawn on the map image and the transmittance of the map image is changed. This prevents the route image from being displayed discontinuously at the boundary between the map images when the road, which configures the navigation route, is to be displayed in one map image but not in the other, giving the user an impression of a smooth, continuous map image.

According to exemplary implementations, the transmittance of the congestion image drawn on the map image is changed as well as the transmittance of the map image. This prevents the congestion image from being displayed discontinuously at the boundary between the map images when the road, for which the congestion level is displayed, is to be displayed in one map image but not in the other, giving the user an impression of a smooth, continuous map image.

DETAILED DESCRIPTION OF EXEMPLARY IMPLEMENTATIONS

Figure 1:
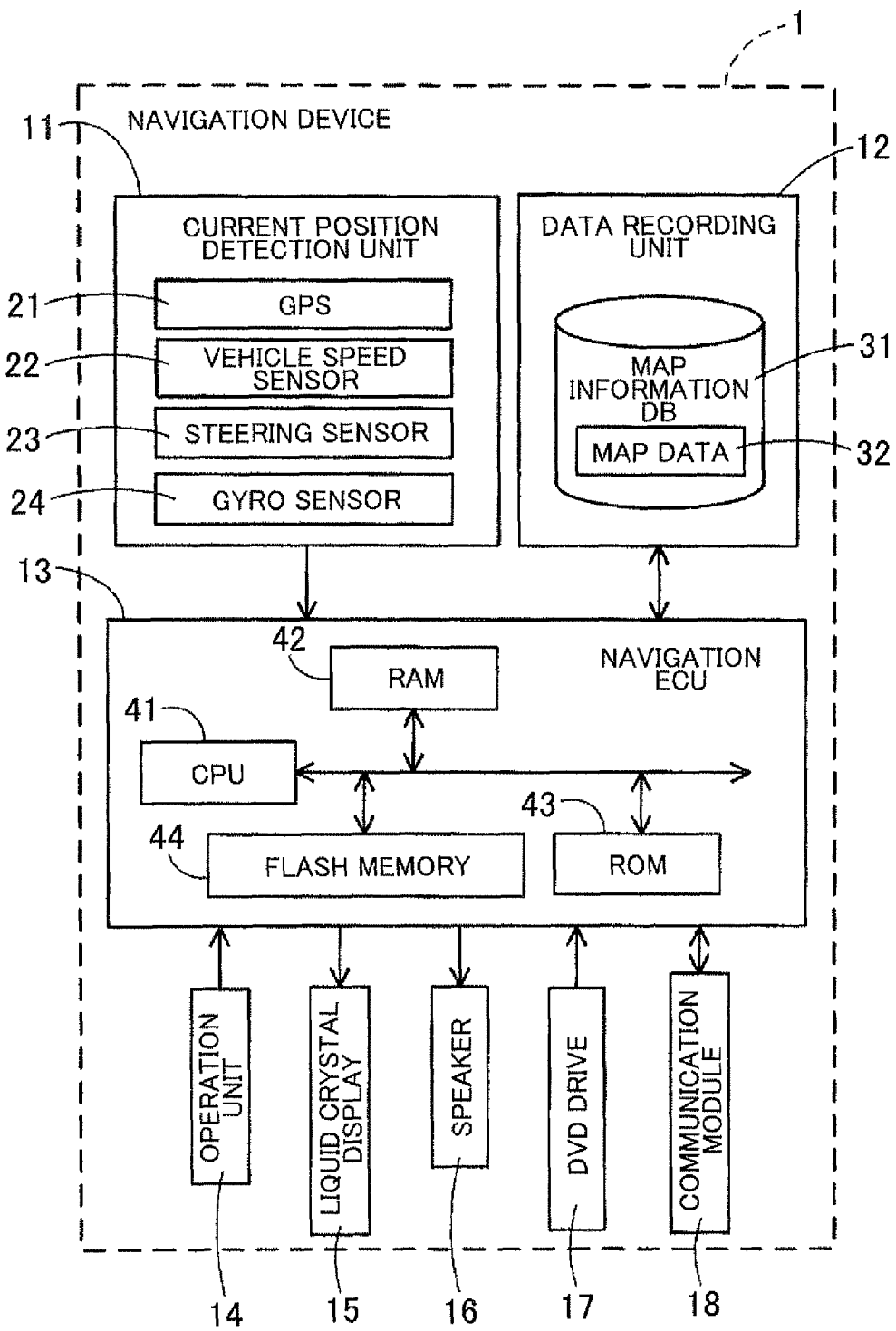
FIG. 1 is a block diagram showing a navigation device in this example.

An example, in which a map image display system and a map image display device are implemented as a navigation device, will be described in detail below with reference to the drawings. First, the following describes the general configuration of a navigation device 1 in this example with reference to FIG. 1. FIG. 1 is a block diagram showing the navigation device 1 in this example.

As shown in FIG. 1, the navigation device 1 in this example includes a current position detection unit 11 that detects the current position of the vehicle in which the navigation device 1 is mounted; a data recording unit 12 in which various types of data are recorded; a controller (e.g., navigation ECU 13) that performs various types of operation processing based on the received information; an operation unit 14 that accepts an operation from the user; a liquid crystal display 15 that displays the map images of the surrounding area of the vehicle to the user; a speaker 16 that outputs voice guidance on a route; a DVD drive 17 that reads data from a DVD used as a recording medium; and a communication module 18 that performs communication with an information center such as a probe center or a Vehicle Information and Communication System center (VICS®).

The following sequentially describes the components of the navigation device 1.

The current position detection unit 11, which includes a GPS 21, a vehicle speed sensor 22, a steering sensor 23, and a gyro sensor 24, can detect the current position and the direction of the vehicle, the vehicle speed, and the current time. In particular, the vehicle speed sensor 22, a sensor that detects the vehicle's traveled distance and the vehicle speed, generates a pulse according to the rotation of the driving wheels of the vehicle and outputs the pulse signal to the navigation ECU 13. The navigation ECU 13 counts the generated pulses to calculate the rotation speed of the driving wheels and the traveled distance. The navigation device 1 need not have all of the five types of sensors described above but may have one or more of the sensors.

The data recording unit 12 includes a hard disk (not shown) and a recording head (not shown). The hard disk is used as an external storage device and a recording medium. The recording head is a driver that reads a map information DB 31 and predetermined programs from, and writes predetermined data to, the hard disk. The data recording unit 12 may also be configured, not by a hard disk, but by a memory card or an optical disc such as a CD and a DVD.

The map information DB 31 is a storage medium in which map data 32, required for route guidance and map display, is stored. The map data 32 is composed of the following types of data: map display data for displaying a map, link data on roads (links), node data on node points, subordinate relation data for identifying the parent-child relation between regions between the layers, point-of-interest data on the points of interests such as facilities, intersection data on the intersections, search data used for searching for a route, and search data used for searching for points of interest. The map data 32 stored in the map information DB 31 is hierarchically structured into a plurality of layers based on the difference in the information amount of a road network as will be described later. In addition, each layer is divided into a plurality of regions for divided storage. The detail of the map data 32 will be described later in detail.

On the other hand, the navigation Electronic Control Unit (ECU) 13 is an electronic control unit that generally controls the navigation device 1. The navigation ECU 13 includes a CPU 41, which works as an arithmetic unit and a control unit, and internal storage mediums, such as a RAM 42, a ROM 43, and a flash memory 44. (Note: the twin "storage medium" as used herein is not intended to encompass transitory signals.) The RAM 42 is a memory which is used by the CPU 41 as a working memory when the CPU 41 performs various types of arithmetic processing and in which route data on a route that is searched for is stored. The ROM 43 stores the control program and the map image display processing program that will be described later (see FIG. 4). The flash memory 44 stores a program read from the ROM 43. The navigation ECU 13 configures various types of units each of which performs a processing algorithm. For example, a navigation route setting unit sets a navigation route from the starting point (for example, vehicle's current position) to the destination. A map data acquisition unit acquires the map data 32 that is divided into a plurality of areas and is hierarchically structured into a plurality of layers based on the information amount of a road network. An image display unit displays the map image of a display target area on the liquid crystal display 15 based on the acquired map data 32. An area division unit divides the display target area into a plurality of division areas where the neighboring areas overlap in part with each other. An image generation unit generates a map image based on different layers for each division area generated by the division. A transmittance change unit gradually changes the transmittance of one of the overlapped map images, included in an area where a plurality of map images thus generated overlap, so that the transmittance of the outside of the division area becomes higher than that of the inside. Among the overlapped map images, a map image drawing unit draws the other of the overlapped map images on the liquid crystal display 15 and, after that, draws the one of the map images, whose transmittance has been changed by the transmittance change unit, on the liquid crystal display 15. A route image drawing unit draws a route image, which is the image indicating the shape of the navigation route to the destination, by superimposing the route image on the map image generated by the image generation unit. A congestion image drawing unit draws a congestion image, which indicates the congestion level of the road, by superimposing the congestion image on the map image generated by the image generation unit.

The operation unit 14, used to enter the starting point that is the travel start point and the destination that is the travel end point, is configured by a plurality of operation switches (not shown) such as various keys and buttons. The navigation ECU 13 controls the execution of various types of operation that is executed based on the switch signal output by pressing the switches. The operation unit 14 may also be configured by a touch panel provided on the front of the liquid crystal display 15. The operation unit 14 may also be configured by a microphone and a voice recognition device.

On the liquid crystal display 15, the following are displayed: map images including a road network, POI icons, traffic information, operation guidance, operation menu, key guidance, navigation route from the current position to the destination, guidance information along the navigation route, news, weather forecast, time of day, mails, and TV programs.

The speaker 16 outputs voice guidance that gives information along the navigation route and guidance on the traffic information based on an instruction from the navigation ECU 13. The speaker 16 is also used to output information on a facility that is searched for during the facility search operation.

The DVD drive 17 is a drive capable of reading data from a recording medium such as a DVD or a CD. Based on the data that is read, music or video is played and the map information DB 31 is updated. Instead of the DVD drive 17, the navigation device 1 may include an HDD or a memory card reader.

The communication module 18 is a communication device that receives traffic information composed of traffic congestion information, traffic restriction information, traffic accident information, and the like transmitted from the traffic information center such as the VICS center or the probe center. For example, a mobile phone and a DCM is used as the communication module 18.

Next, the following describes the map data 32 stored in the map information DB 31.

Figure 2:
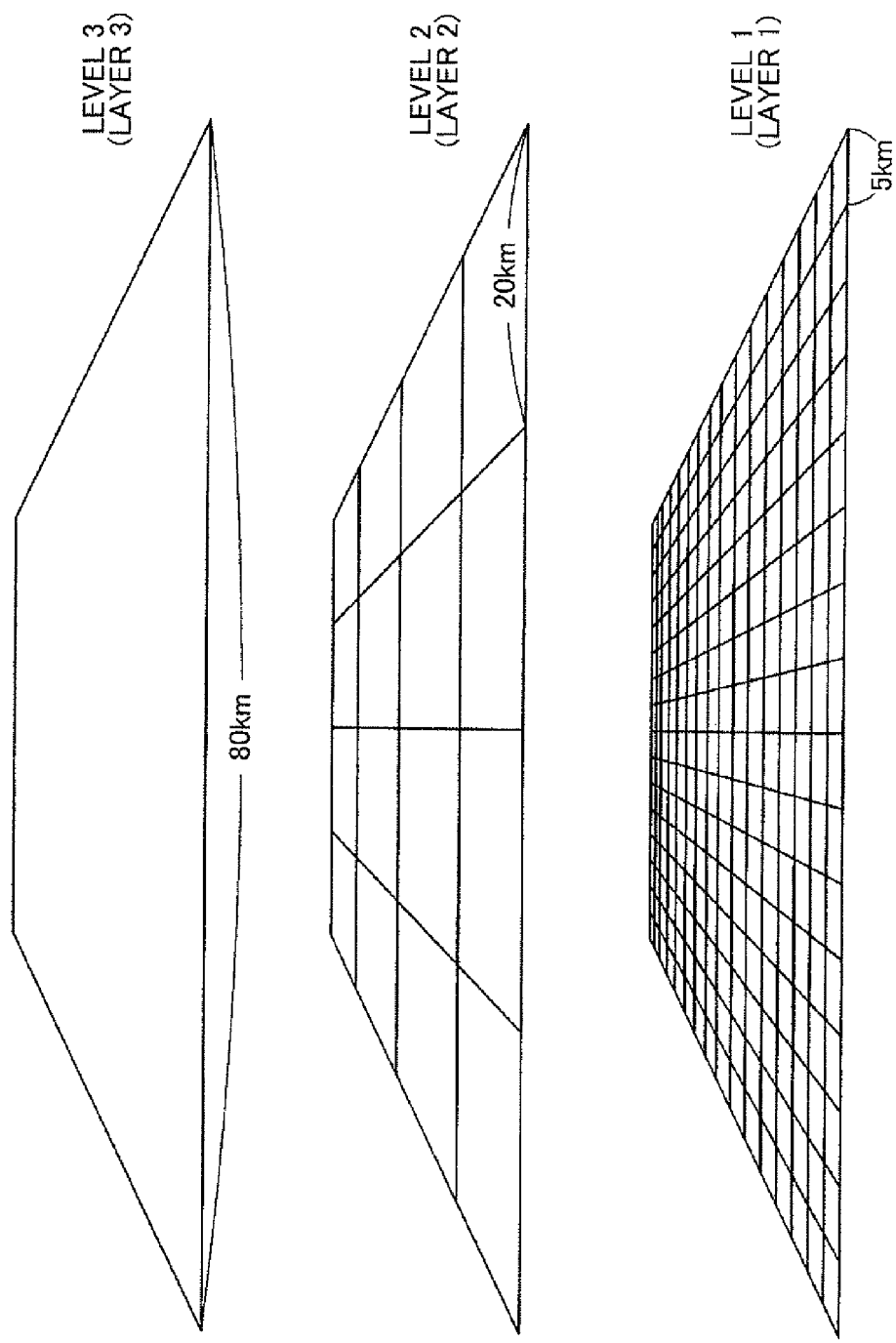
FIG. 2. is a diagram schematically showing map data stored in a map information DB and hierarchically structured into three layers.

In this example, the map data 32 is hierarchically structured into three layers according to the information amount of a road network as shown in FIG. 2. FIG. 2 is a diagram schematically showing the map data 32 hierarchically structured into three layer levels, which is stored in the map information DB 31. In this case, hierarchical level 1 (hereinafter called layer 1) corresponds to map data divided into a plurality of 5 km-square regions, hierarchical level 2 (hereinafter called layer 2) corresponds to map data divided into a plurality of 20 km-square regions, and third hierarchical level 3 (hereinafter called layer 3) corresponds to map data divided into a plurality of 80 km-square regions.

A lower-level layer includes the amount of road network information larger than that of a higher-level layer. For example, layer 3 includes information on the national expressways, freeways, urban expressways, and toll roads. Layer 2 includes information on the major open roads such as national roads and prefectural roads in addition to the road network included in layer 3. Layer 1 includes information on the detailed road network of all other open roads, such as narrow streets, in addition to the road network included in layer 2.

In addition, a lower-level layer includes detailed data but covers a narrower range while a higher-level layer includes only coarse data but covers a wider range. For example, layer 1, the lowest level, includes road data on all roads including narrow streets but covers the range of municipal areas only while layer 3, the highest level, includes road data on expressways and toll roads only but covers the whole country.

The shape of the layer at each level, that is, the area of the range covered by each region, may be determined appropriately. The number of levels of map data, that is, the number of hierarchical levels of layers, need not always be three, but may be two or may be four or more.

Next, the following describes the detail of data configuring the map data 32.

The map data 32 is configured for each layer. The map data 32 of each layer is configured by map display data, link data, node data, subordinate relation data, point of interest data, intersection data, search data, and retrieval data as described above.

As the map display data, the map drawing information for drawing the map image corresponding to the map data 32 of each layer is stored.

As the link data, the following data is recorded in the map data 32 of each layer for each of the links configuring a road: that is, the data indicating the width, slope, cant, and bank, the state of road surface, the number of lanes of the road, the position at which the number of lanes is decreased, the position at which the width of the road becomes narrowed, and the railroad crossings, of the road to which the link belongs. For the corner, the data indicating the curvature radius, intersection, T junction, and entrance and exit of the corner is recorded. For the road attribute, the data indicating whether the road is a downslope or upslope is recorded. For the road type, the data indicating whether the road is an open road such as a national road, prefectural road, and narrow street or a toll road such as a national expressway, freeway, urban expressway, ordinary toll road, and toll bridge is recorded. In addition, for a toll road, the data indicating the service road (ramp way) at the entrance and exit of the toll road and the tollbooth (interchange) of the toll road is recorded. The links to be stored as link data for each layer differ among layers as described above. The link data on more links is stored for a lower-level layer.

As the node data, the following data is recorded in the map data 32 of each layer: the branch points (including intersections and T junctions) of a road, the node-point coordinates (positions) that are set at predetermined distance intervals according to the curvature radius of each road, the node attribute indicating whether the node corresponds to an intersection, the connection link number list that is a list of link numbers of the links connecting to the node, the neighboring node number list that is a list of node numbers of the other nodes that neighbor the node via a link, and the height (altitude) of each node point. Also stored as the node data is the higher-level connection data that identifies the connection relation between nodes included in the layers at different hierarchical levels (for example, layer 1 node and layer 2 node, layer 2 node and layer 3 node).

As the subordinate relation data, the data identifying the parent-child relation of the regions across layers is stored for the regions configuring each layer. More specifically, data indicating association between a layer 3 region and layer 2 regions included in the layer 3 region and data indicating association between a layer 2 region and layer 1 regions included in the layer 2 region are stored.

Figure 3:
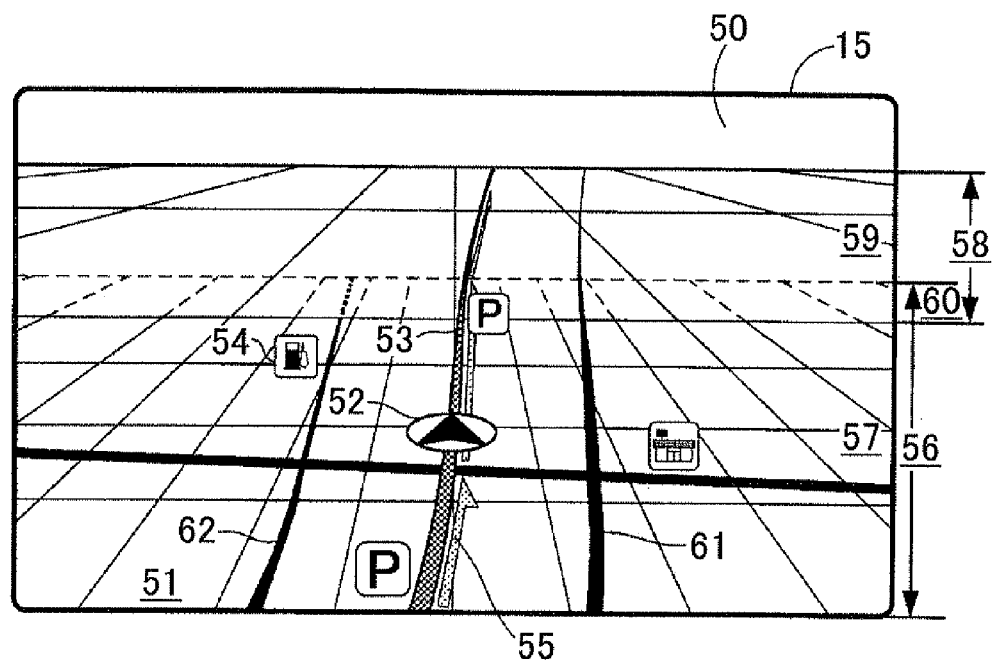
FIG. 3. is a diagram showing an example of a driving guidance screen displayed on a liquid crystal display while a vehicle is traveling.

Next, with reference to FIG. 3, the following describes the driving guidance screen displayed on the liquid crystal display 15. FIG. 3 is a diagram showing an example of the driving guidance screen displayed on the liquid crystal display 15 while a vehicle is traveling. In the map image on the driving guidance screen shown in FIG. 3, the division lines, which divide a layer into regions, are displayed for the sake of description (note that the division lines are not displayed in the driving guidance screen actually displayed on the liquid crystal display 15). In the map image on the driving guidance screen shown in FIG. 3, only four roads, selected from many roads and backgrounds displayed in the map image, are displayed with the other roads and backgrounds omitted for clarity of illustration.

On a driving guidance screen 50 displayed on the liquid crystal display 15, the following are displayed in bird's-eye view as shown in FIG. 3: map image 51 of the surrounding area of the vehicle's current position, vehicle position mark 52 indicating the vehicle's current position matched on the map, route image 53 indicating the shape of the navigation route that is set on the navigation device 1 (this is displayed only when the navigation route is set), POI icon 54 indicating the position and the genre of a facility (parking lot, gas station, restaurant, convenience store, etc.), and congestion image 55 that is an image (arrow) indicating the congestion level of the road. As the map image 51, the background (sea, river, flatland, forest, mountain, etc.) and the road shapes are drawn. When the vehicle's current position changes while the driving guidance screen 50 is displayed, the display target area of the map image 51 changes accordingly with the map image 51 scrolled on the driving guidance screen 50. The user views the driving guidance screen 50 to know the vehicle's current position, facility information on the surrounding area of the vehicle, and the road shape (including the navigation route when it is set).

In this example, the map image 51 displayed on the driving guidance screen 50 is configured by combining two map images that are drawn based on the two layers at different levels. More specifically, a neighboring area 56 (for example, an area from the bottom edge to the center of the screen), which is a division area nearer to the virtual point-of-view located above the map, is configured by a reference map image 57 that is drawn on the layer at the reference level (for example, level 1) based on the map scale. On the other hand, a distant area 58 (for example, an area from the center of the screen to the horizon), which is a division area distant from the virtual point-of-view, is configured by a higher-level map image 59 that is drawn based on a layer (for example, level 2) higher than the reference level. For an overlapping area 60 where the neighboring area 56 and the distant area 58 overlap, the reference map image 57 is superimposed on the higher-level map image 59 that has been drawn. In addition, the transmittance of the reference map image 57 in the overlapping area 60 is changed gradually so that the transmittance of the outside of the neighboring area 56 becomes higher than the transmittance of the inside. Therefore, a road (for example, a road 61 that is a major road such as a national road or a prefectural road) configured by the links included in both the reference-level layer and the higher-level layer is displayed, extending from the neighboring area 56 to the distant area 58. On the other hand, a road (for example, a road 62 that is a non-major open road) configured by the links included only in the reference level is displayed only in the neighboring area 56. In addition, in the overlapping area 60, this road is displayed with the transmittance becoming gradually higher as it approaches the distant area 58 (that is, the top side of FIG. 3) and, when the road goes beyond the overlapping area 60 and enters the distant area 58, is not displayed. The detailed drawing processing of the reference map image 57 and the higher-level map image 59 will be described later.

Figure 4:
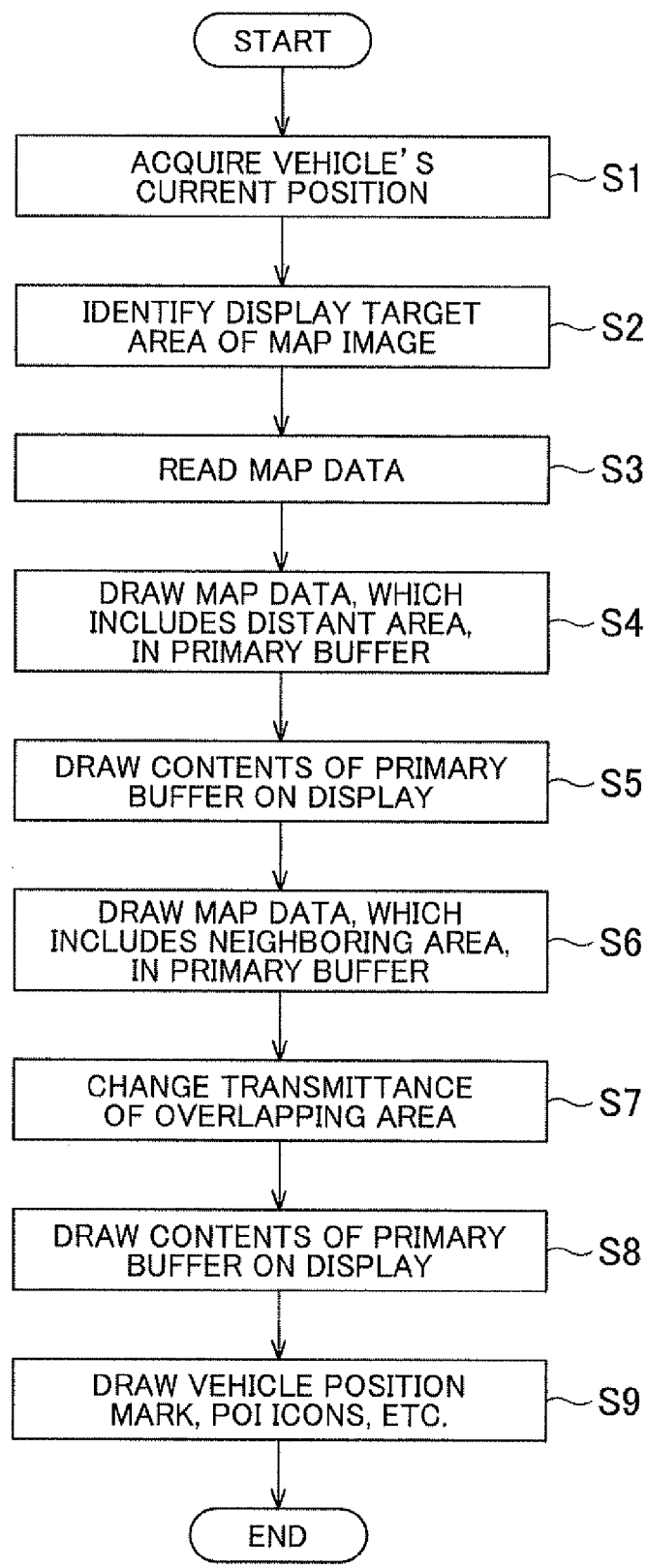
FIG. 4. is a diagram showing the flowchart of a map image display processing algorithm in this example.

Next, display processing method will be described with reference to the display processing algorithm shown in FIG. 4. The process algorithm may be implemented in the form of a computer program that is stored in, for example, the data recording unit 12 RAM 42, ROM 43, or flash memory 44, and executed by the CPU 41. Although the structure of the above-described navigation device 1 is referenced in the description of the process, the reference to such structure is exemplary, and the method need not be limited by the specific structure of the navigation device 1.

After the ACC power supply of the vehicle is turned on, the map image display processing program is executed for displaying the driving guidance screen 50 (FIG. 3), which includes the map image of the surrounding area of the vehicle, on the liquid crystal display 15.

First, in step (hereinafter abbreviated S) 1 of the map image display processing program, the CPU 41 acquires the vehicle's current position as the reference position for providing guidance on map information on the surrounding area. More specifically, the CPU 41 detects the vehicle's current position using the detection result of the sensors of the current position detection unit 11. In addition, the CPU 41 uses the map data 32 to perform map matching processing for identifying the vehicle's current position on the map. Although the CPU 41 acquires the vehicle's current position as the reference position in S1, any other point on the map other than the vehicle's current position may also be used as the reference position. For example, when the user scrolls the map on the map screen, any position determined based on the user's operation may be acquired as the reference position.

Figure 5:
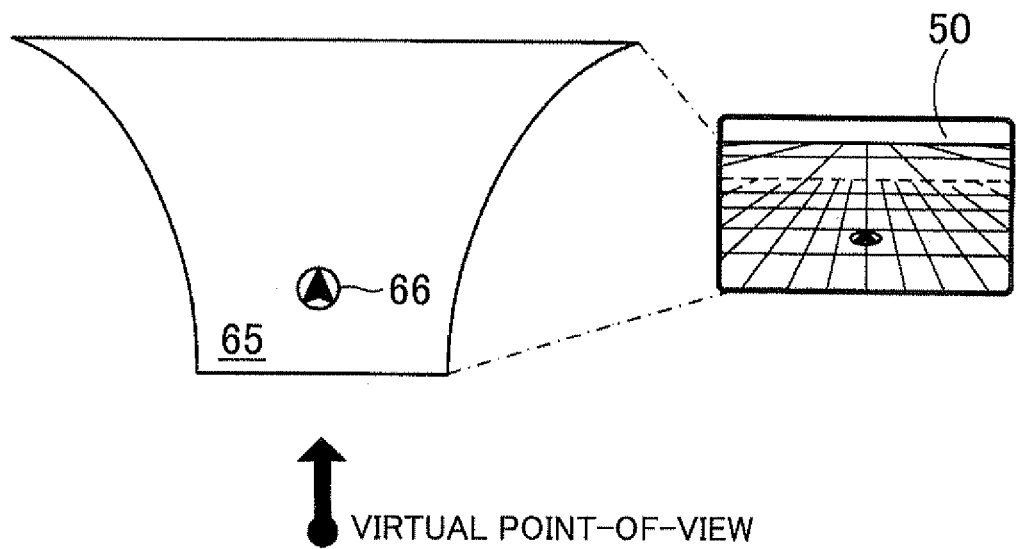
FIG. 5. is a diagram showing an example of the display target area of a map image.

Next, in S2, the CPU 41 identifies the display target area of the map image with the vehicle's current position, acquired in S1, as the reference. FIG. 5 is a diagram showing an example of a display target area 65 of the map image identified in S2. The navigation device 1 in this example sets an area, which is included in the map and is visually recognized when viewing the map downward obliquely from the virtual point-of-view above the map, as the display target area and then displays the driving guidance screen 50 in bird's-eye view shown in FIG. 3. Therefore, the display target area 65 of the map image is an almost-trapezoid-shaped area including the surrounding area at a vehicle's current position 66 as shown in FIG. 5.

Figure 6:
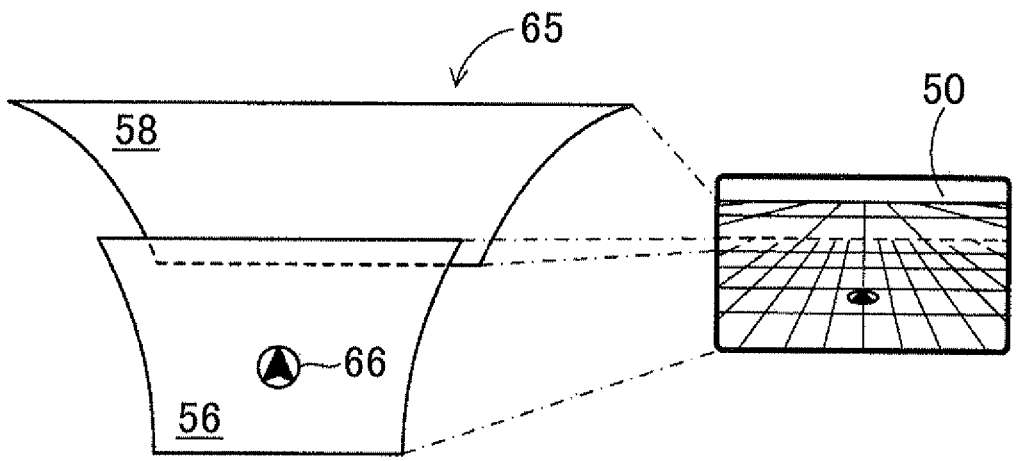
FIG. 6. is a diagram showing division areas created by dividing the display target area.

Next, in S3, the CPU 41 reads the map data 32, corresponding to the display target area 65 identified in S2, from the map information DB 31. The navigation device 1 in this example divides the display target area 65 into a plurality of division areas according to the distance from the virtual point-of-view as described above. More specifically, the display target area 65 is divided into the following two: neighboring area 56 near the virtual point-of-view and the distant area 58 distant from the virtual point-of-view. In each of the areas, the CPU 41 draws a map image based on the layer that differs according to the area. More specifically, the CPU 41 draws a map image in a division area based on a layer with the larger amount of road network information as the division area is nearer the virtual point-of-view. For example, the CPU 41 draws a map image in the neighboring area 56 (for example, an area from the bottom edge to the center of the screen) based on a layer at the reference level (for example level 1) that is based on the map scale while the CPU 41 draws a map image in the distant area 58 (for example, an area from the center of the screen to the horizon) based on a layer at a level (for example, level 2)

higher than the reference level. Therefore, in S3, the CPU 41 reads the map data 32 to be drawn in the display target area 65 as shown in FIG. 6; that is, the CPU 41 reads the map data 32 of the layer at the reference level (for example, level 1) for the neighboring area 56, and the map data 32 of a layer at a higher level (for example, level 2) for the distant area 58, as shown in FIG. 6. Note that the map data 32 is read on a region basis.

Figure 7:
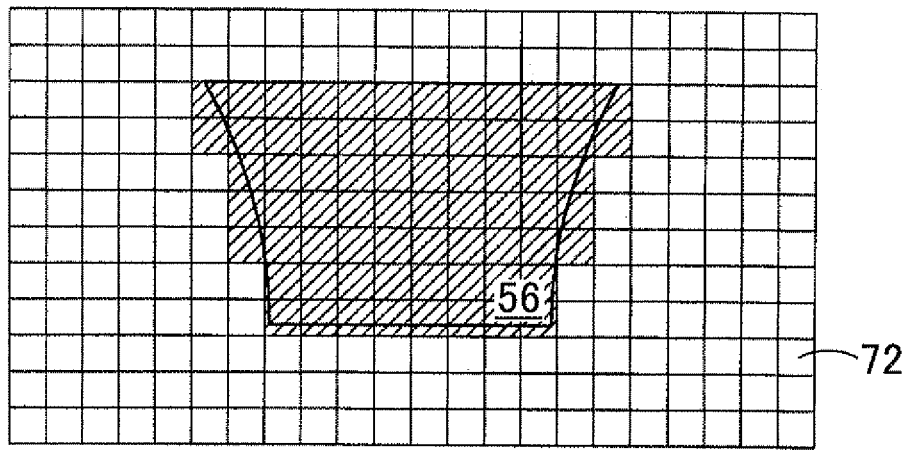
FIG. 7. is a diagram showing an example of map data that is read in step 3.
Figure 7:
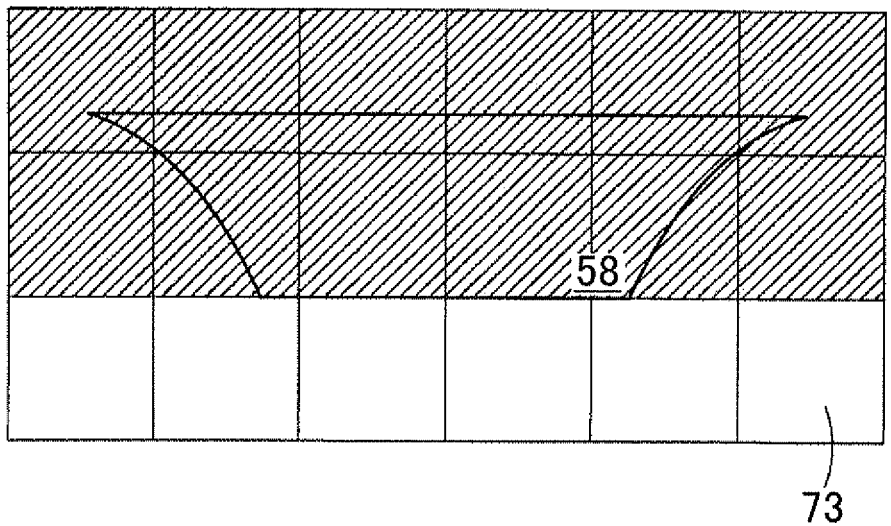

FIG. 7 is a diagram showing an example of the map data 32 read in S3. In the example shown in FIG. 7, the map data of a plurality of regions 72, which configure the map data of the layer at level 1 and which correspond to the shaded area including the neighboring area 56, is read as the map data 32 of the neighboring area 56. On the other hand, the map data of a plurality of regions 73, which configure the map data of the layer at level 2 and which correspond to the shaded area including the distant area 58, is read as the map data 32 of the distant area 58. Note that the map data of the layer at level 3 may be read as the map data including the distant area 58. Similarly, the map data of the layer at level 2 may be read as the map data including the neighboring area 56 and, at the same time, the map data of the layer at level 3 may be read as the map data including the distant area 58.

Figure 8:
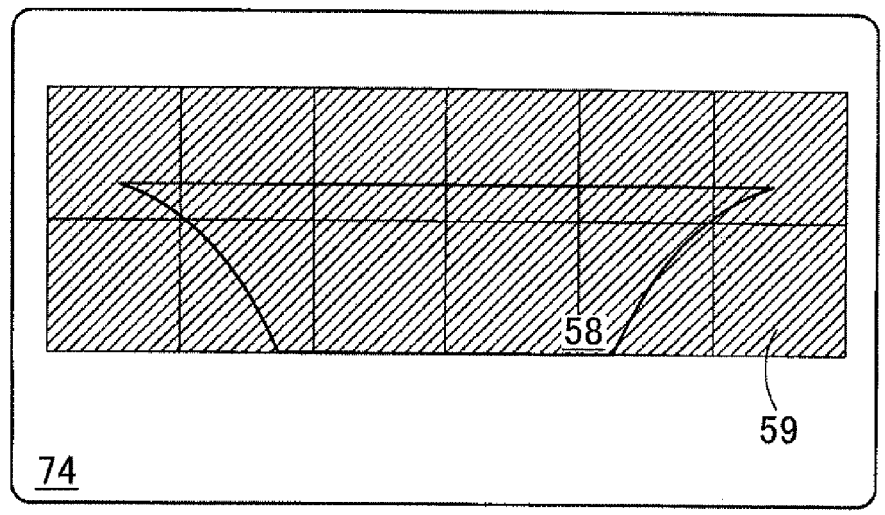
FIG. 8. is a diagram showing the map image of a distant area drawn in a primary buffer.

Next, in S4, the CPU 41 draws the map image (higher-level map image 59), which is the map data 32 read in S3 and is based on the map data including the distant area 58 (that is, map data of a layer (for example, level 2) higher than the reference level), in the primary buffer in the memory. As a result, the higher-level map image 59, which includes the distant area 58, is drawn in a primary buffer 74 as shown in FIG. 8.

Figure 9:
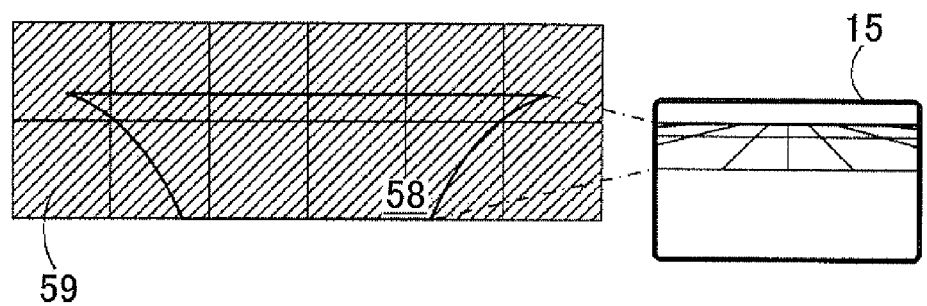
FIG. 9. is a diagram showing an example in which the map image of a distant area drawn in the primary buffer is drawn on the liquid crystal display.

Next, in S5, the CPU 41 draws the perspective projection of the map image, drawn in the primary buffer in S4, on the liquid crystal display 15. As a result, the higher-level map image 59, which includes the distant area 58, is converted to bird's-eye view and drawn on the liquid crystal display 15 as shown in FIG. 9.

Figure 10:
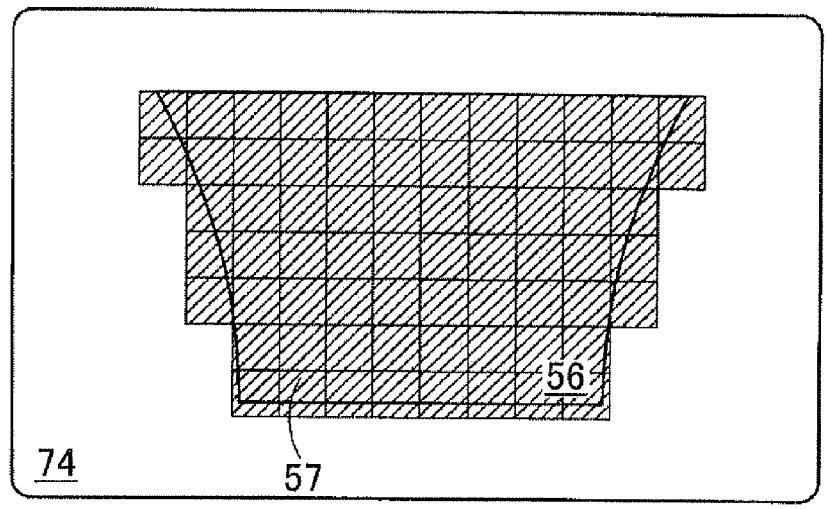
FIG. 10. is a diagram showing the map image of a neighboring area drawn in the primary buffer.

After that, in S6, the CPU 41 draws the map image (reference map image 57), which is the map data 32 read in S3 and is based on the map data including the neighboring area 56 (that is, map data of the layer (for example, level 1) at the reference level), in the primary buffer in the memory. As a result, the reference map image 57, which includes the neighboring area 56, is drawn in a primary buffer 74 as shown in FIG. 10.

Figure 11:
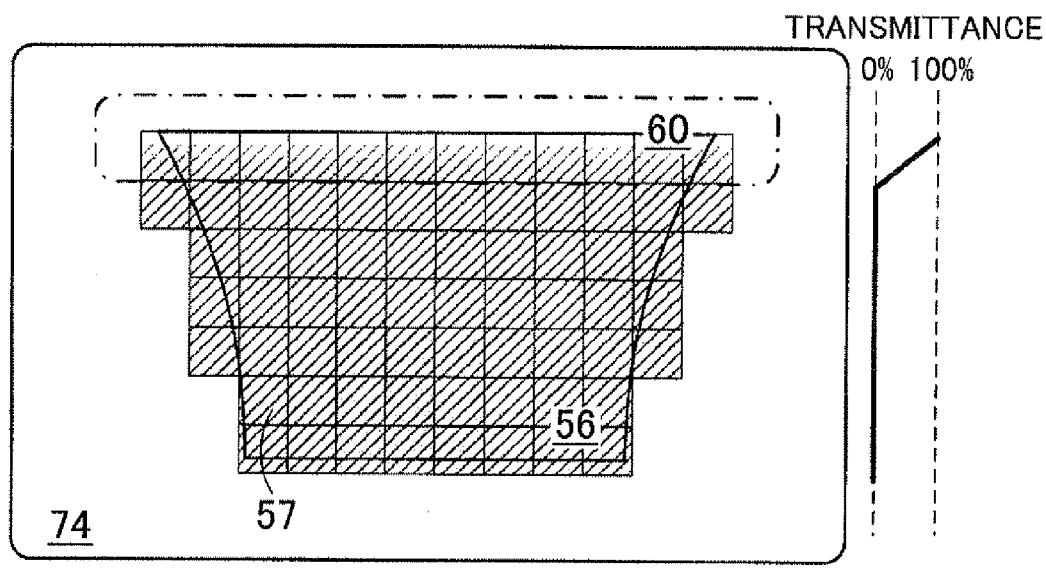
FIG. 11. is a diagram showing how the transmittance of the map image of a neighboring area, drawn in the primary buffer, changes.

Next, in S7, the CPU 41 gradually changes the transmittance of the overlapping area 60, a part of the area of the reference map image 57 drawn in the primary buffer in S6, so that the transmittance of the outside of the neighboring area 56 becomes higher than that of the inside (or, so that the transmittance becomes higher as it goes towards the distant area 58). As a result, the transmittance of the reference map image 57 drawn in the primary buffer 74 changes as shown in FIG. 11; that is, the transmittance is set to 0% in the range of the neighboring area 56 that does not overlap with the distant area 58, is changed gradually from 0% to 100% in the range of the overlapping area 60 that overlaps with the distant area 58, and is set to 100% at the end of the distant area.

Figure 12:
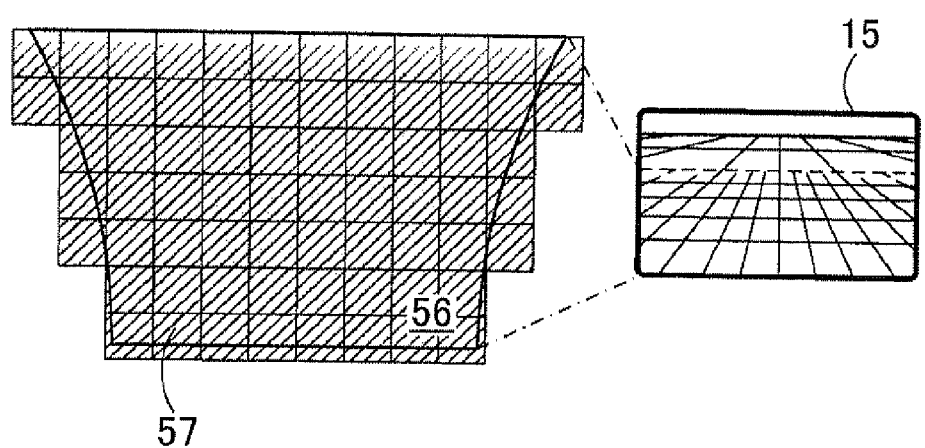
FIG. 12. is a diagram showing an example in which the map image of a neighboring area, drawn in the primary buffer, is drawn on the liquid crystal display.

Next, in S8, the CPU 41 draws the perspective projection of the reference map image 57, whose transmittance has been changed in S7, on the liquid crystal display 15. This causes the reference map image 57, which includes the neighboring area 56, to be converted to bird's-eye view and to be drawn on the higher-level map image 59, which includes the distant area 58 drawn in S5, for display on the liquid crystal display 15 as shown in FIG. 12. As a result, a road (for example, a major road such as a national road or a prefectural road) configured by the links included in both the reference-level layer and the higher-level layer is displayed, extending from the neighboring area 56 to the distant area 58. On the other hand, a road (for example, a non-major open road) configured by the links included only in the reference level is displayed only in the neighboring area 56. In addition, in the overlapping area 60, this road is displayed with the transmittance becoming gradually higher as it approaches the distant area 58 (that is, the top side of the liquid crystal display 15 (the side distant from the point-of-view)) and, when the road goes beyond the overlapping area 60 and enters the distant area 58, is not displayed. Therefore, even when a road to be displayed differs between the neighboring area 56 and the distant area 58, the navigation device prevents the road from being displayed as a discontinuous image, giving the user an impression of a smooth, continuous map image.

When a navigation route is set in the navigation device 1, the CPU 41 draws the route image 53 (see FIG. 3), which is the image indicating the shape of the navigation route to the destination, in the primary buffer, with the navigation route superimposed on the map image, when drawing the map image in steps S4 and S6. Therefore, in S7, the transmittance of the route image 53 is changed at the same time the transmittance of the map image is changed. As a result, when the road configuring the navigation route is to be displayed in the neighboring area 56 but not in the distant area 58, the navigation device 1 displays the map image with no sudden discontinuation in the route image 53, giving the user an impression of a smooth, continuous image.

In addition, when the congestion image 55 (see FIG. 3) indicating the congestion level of a road is displayed on the navigation device 1, the CPU 41 draws the congestion image 55, included in the map image to indicate the congestion level, in the primary buffer with the congestion image 55 superimposed on the map image when drawing the map image in S4 and S6. Therefore, in S7, the transmittance of the congestion image 55 is changed at the same time the transmittance of the map image is changed. As a result, when a road for which the congestion level is displayed is to be displayed in the neighboring area 56 but not in the distant area 58, the navigation device 1 displays the congestion image 55 with no sudden discontinuation in the congestion image 55, giving the user an impression of a smooth, continuous map image.

After that, in S9, the CPU 41 draws the vehicle position mark 52 indicating the vehicle's current position, POI icons 54, point names, and operation buttons on the liquid crystal display 15. As a result, the driving guidance screen 50, shown in FIG. 3, is displayed on the liquid crystal display 15.

As described in detail above, the navigation device 1 in this example, the point image display method by means of the navigation device 1, and computer program executed in the navigation device 1 perform the following processing. The display target area of a map image is identified based on the reference position such as the vehicle's current position (S2), the display target area is divided into the neighboring area 56 and the distant area 58, the map data of a layer for each of the division areas where the amount of road network information differs among the division areas is read (S3), the plurality of map images 57 and 59 generated based on the map data that has been read are combined, and the map image 51 is displayed on the liquid crystal display 15 (S4-S9). Therefore, the data amount of map data to be read can be reduced and, at the same time, the processing load and the processing time of the CPU required for drawing a map image based on the map data that has been read can also be reduced. In addition, the transmittance of one of the map images in an area, where the plurality of map images 57 and 59 overlap, is changed to prevent the background and roads, included in the map image, from being displayed as a discontinuous image at the boundary between the map images, giving the user an impression of a smooth, continuous map image.

In particular, when displaying the map image 51 in bird's-eye view, the map image is displayed as follows. That is, the map image (reference map image 57) in the neighboring area 56 where a large amount of information is required is displayed, based on a layer where the information amount on the road network is large, and the map image (higher-level map image 59) in the distant area 58 where a large amount of information is not required is displayed, based on a layer where the information amount on the road network is small. Therefore, the data amount of map data to be read can be reduced, and, at the same time, the processing load and the processing time of the CPU required for drawing a map image based on the map data that has been read can also be reduced. In addition, the map image 51 can also be displayed in a form the user feels easy to view.

In an area where the plurality of map images 57 and 59 overlap, the transmittance of the map image (reference map image 57), generated based on a layer where the information amount on the road network is larger, is changed to prevent the background and the roads included in the map image from being displayed as a discontinuous image at the boundary between the map images, giving the user an impression of a smooth, continuous map image.

In an area where the plurality of map images 57 and 59 overlap, the transmittance of the map image, which includes the background and the road shape, is changed to prevent the background and the roads included in the map image from being displayed as a discontinuous image at the boundary between the map images, giving the user an impression of a smooth, continuous map image.

The transmittance of the route image 53 that is drawn on the map image along with the map image is also changed. Therefore, when a road configuring the navigation route is to be displayed in the neighboring area 56 but not in the distant area 58, the route image 53 is prevented from being displayed as a discontinuous image at the boundary between the map images, giving the user an impression of a smooth, continuous map image.

The transmittance of the congestion image 55 that is drawn on the map image along with the map image is also changed. Therefore, when a road for which the congestion level is displayed is to be displayed in the neighboring area 56 but not in the distant area 58, the congestion image 55 is prevented from being displayed as a discontinuous image at the boundary between the map images, giving the user an impression of a smooth, continuous map image.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, in this example, the transmittance of the map image based on the neighboring area 56 (that is, reference map image 57 that is the map image generated based on a layer where the information amount on the road network is large) is changed in the overlapping area 60 where the neighboring area 56 and the distant area 58 overlap. Instead of this, the transmittance of the map image based on the distant area 58 (that is, higher-level map image 59 that is the map image generated based on a layer where the information amount of the road network is small) may be changed. In that case, it is required to draw the reference map image 57 on the liquid crystal display 15 first and, then, to draw the higher-level map image 59.

Although the display target area of a map image is divided into two, neighboring area 56 and distant area 58, in this example, this area may be divided into three or more. Although the bird's-eye view of the map image, created by viewing the map downward obliquely from the virtual point-of-view above the map, is displayed, a 2D map image created by viewing the map from the virtual point-of-view above the map directly downward may be displayed.

In this example, the transmittance of the route image 53 and the congestion image 55 are changed in the same way as the map image. However, the transmittance of the route image 53 and the congestion image 55 may not be changed. That is, the route image 53 and congestion image 55 may be drawn at the same time the vehicle position mark 52 is drawn in S9.

The inventive principles described herein may be applied not only to a navigation device but also to a device having the function to display a map image. For example, the principles may be applied to a mobile terminal such as a mobile phone and a PDA, a personal computer, and a mobile music player (hereinafter, those terminals are called a mobile terminal). The principles may also be applied to a system composed of a server and mobile terminals. In that case, each step of the map image display processing program described above (FIG. 4) may be executed by one of the server or the mobile terminal. When the principles are applied to a mobile terminal, the map image is displayed sometimes with the current position of a non-vehicle movable body, such as a terminal user or a bicycle, as the reference position.

What is claimed is:

1. A map image display system comprising:
a controller configured to:
    acquire map data that is divided into a plurality of areas and hierarchically structured into a plurality of layers based on an amount of road network information;
    define a display target area on a display device based on the acquired map data;
    divide the display target area into a plurality of division areas with parts of neighboring ones of the division areas overlapping each other;
    generate a map image for each of the division areas, each map image being based on a different layer of the map data;
    in an area where two or more of the generated map images overlap, gradually change a transmittance of a first one of the overlapped map images so that a transmittance of an outer portion of the first overlapped map image becomes higher than a transmittance of an inner portion of the first overlapped map image;
    display a second one of the overlapped map images on the display device; and
    after the second map image is displayed on the display device, display the first map image on the display device so that the first map image is overlapped on the displayed second map image.

2. The map image display system according to claim 1, wherein the controller is configured to:
sets an area of a map in the display target area, the set area visually recognized when viewing the map downward obliquely from a virtual point-of-view above the map;
divide the display target area into the plurality of division areas according to a distance from the virtual point-of-view; and generate the first map image based on a division area nearer the virtual point-of-view and a layer of the acquired map data having a larger amount of road network information.

3. The map image display system according to claim 1, wherein the controller is configured to:
gradually change the transmittance of the first map image.

4. The map image display system according to claim 1, wherein:
the first overlapped map image includes an image indicating a background and a road shape.

5. The map image display system claim 1, wherein the controller is configured to:
display a route image superimposed on the first overlapped map image, the route image being an image indicating a shape of a navigation route to a destination; and
change a transmittance of the route image as well as the transmittance of the first map image.

6. The map image display system according to claim 4, wherein the controller is configured to:
display a congestion image superimposed on the first map image, the congestion image being an image indicating a congestion level of a road; and
change a transmittance of the congestion image as well as the transmittance of the map image.

7. A navigation device comprising the map image display system of claim 1.

8. A map image display method comprising:
acquiring map data that is divided into a plurality of areas and hierarchically structured into a plurality of layers based on an amount of road network information;
defining a display target area on a display device based on the acquired map data;
dividing the display target area into a plurality of division areas with parts of neighboring ones of the division areas overlapping each other;
generating a map image for each of the division areas, each map image being based on a different layer of the map data;
in an area where two or more of the generated map images overlap, gradually changing a transmittance of a first one of the overlapped map images so that a transmittance of an outer portion of the first overlapped map image becomes higher than a transmittance of an inner portion of the first overlapped map image;
displaying a second one of the overlapped map images on the display device; and
after the second map image is displayed on the display device, displaying the first map image on the display device so that the first map image is overlapped on the displayed second map image.

9. The map image display method according to claim 8, further comprising:
setting an area of a map in the display target area, the set area visually recognized when viewing the map downward obliquely from a virtual point-of-view above the map;
dividing the display target area into the plurality of division areas according to a distance from the virtual point-of-view; and
generating the first map image based on a division area nearer the virtual point-of-view and a layer of the acquired map data having a larger amount of road network information.

10. The map image display method according to claim 8, further comprising:
gradually changing the transmittance of the first map image.

11. The map image display method according to claim 8, wherein:
the first overlapped map image includes an image indicating a background and a road shape.

12. The map image display method according to claim 8, further comprising:
displaying a route image superimposed on the first overlapped map image, the route image being an image indicating a shape of a navigation route to a destination; and
changing a transmittance of the route image as well as the transmittance of the first map image.

13. The map image display method according to claim 8, further comprising:
displaying a congestion image superimposed on the first map image, the congestion image being an image indicating a congestion level of a road; and
changing a transmittance of the congestion image as well as the transmittance of the map image.

14. The map image display method according to claim 8, wherein the method is executed by a controller.

15. A computer-readable storage medium storing a computer-executable image display program, the program comprising:
instructions for acquiring map data that is divided into a plurality of areas and hierarchically structured into a plurality of layers based on an amount of road network information;
instructions for defining a display target area on a display device based on the acquired map data;
instructions for dividing the display target area into a plurality of division areas with parts of neighboring ones of the division areas overlapping each other;
instructions for generating a map image for each of the division areas, each map image being based on a different layer of the map data;
instructions for, in an area where two or more of the generated map images overlap, gradually changing a transmittance of a first one of the overlapped map images so that a transmittance of an outer portion of the first overlapped map image becomes higher than a transmittance of an inner portion of the first overlapped map image; and
instructions for displaying a second one of the overlapped map images on the display device;
instructions for, after the second map image is displayed on the display device, displaying the first map image on the display device so that the first map image is overlapped on the displayed second map image.

16. The computer-readable storage medium according to claim 15, the program further comprising:
instructions for setting an area of a map in the display target area, the set area visually recognized when viewing the map downward obliquely from a virtual point-of-view above the map;
instructions for dividing the display target area into the plurality of division areas according to a distance from the virtual point-of-view; and
instructions for generating the first map image based on a division area nearer the virtual point-of-view and a layer of the acquired map data having a larger amount of road network information.

* * * * *